United States Patent [19]

Taira

[11] 4,436,384
[45] Mar. 13, 1984

[54] BINOCULAR STEREO-MICROSCOPE

[75] Inventor: Akio Taira, Hachiouji, Japan

[73] Assignee: Olympus Optical Co., Ltd., Tokyo, Japan

[21] Appl. No.: 259,239

[22] Filed: Apr. 30, 1981

[30] Foreign Application Priority Data

May 8, 1980 [JP] Japan .................................. 55-59993

[51] Int. Cl.³ ............................................. G02B 21/22
[52] U.S. Cl. .................................................. 350/515
[58] Field of Search .................. 350/49, 80, 35, 36, 350/51, 50, 33, 31, 286, 287, 53, 299, 515

[56] References Cited

U.S. PATENT DOCUMENTS

| | | | |
|---|---|---|---|
| 1,964,075 | 6/1934 | Ott | 350/36 |
| 3,788,727 | 1/1974 | Abe | 350/36 |
| 3,909,106 | 9/1975 | Buhler | 350/35 |

FOREIGN PATENT DOCUMENTS

| | | | |
|---|---|---|---|
| 360739 | 7/1938 | Italy | 350/286 |
| 515973 | 12/1939 | United Kingdom | 350/286 |
| 637198 | 5/1950 | United Kingdom | 350/51 |

OTHER PUBLICATIONS

Benford, J. R., *Applied Optics*, vol. 3, No. 9, Sep. 1964, pp. 1044–1045.

*Primary Examiner*—Jon W. Henry
*Attorney, Agent, or Firm*—Cushman, Darby & Cushman

[57] ABSTRACT

A binocular stereo-microscope comprising a Porro prism arranged between each objective and eyepiece in which three prisms constituting the Porro prism are arranged that the second prism is inclined in respect to the first prism and the third prism is inclined in respect to the second prism, the Porro prism being thereby arranged to have the function of an optical axis deflecting prism, the binocular stereo-microscope thereby enabling to observe an image free from rotation.

1 Claim, 9 Drawing Figures

BINOCULAR STEREO-MICROSCOPE

BACKGROUND OF THE INVENTION (a) Field of the Invention

The present invention relates to a binocular stereo-microscope.

(b) Description of the Prior Art

Generally, optical axes of objectives of a binocular stereo-microscope are vertical in order to enable the observation of an object placed horizontally. However, in a formation wherein eyepieces are arranged directly on those optical axes of objectives, a long observation causes fatigue to the observer since he has to look vertically into the eyepieces. Therefore, optical axes are deflected as described below in order to facilitate observation. Hereinafter, the description is given based on one of the right and left optical systems constituting the binocular stereo-microscope. That is, as shown in FIG. 1, the optical axis $O_1$ of the objective 1 is made inclined by disposing an optical axis deflection prism 2 and an eyepiece 4 to enable an observer to look into the eyepiece 4 only by slightly declining his head downwards. Further, as it is necessary to enable a "stereo" observation, it is not favorable that an inverted image is observed as in ordinary microscopes. Therefore, a conventional binocular stereo-microscope has a Porro prism 3 arranged before the eyepiece 4 on the inclined optical axis $O_2$ to erect the image so that an object can be observed exactly the same as its real form in both vertical and horizontal directions. However, such formation needs two kinds of prisms which are not economical and increase the size and weight of the eyepiece portion.

SUMMARY OF THE INVENTION

It is, therefore, a primary object of the present invention to provide a binocular stereo-microscope in which the erection of image and the optical axis deflection are simultaneously realized with only the Porro prism.

This object, according to the present invention, is attained by providing a right Porro prism and a left Porro prism each of which has a first, second, third and fourth reflecting surfaces, arranging each Porro prism so that both the first and fourth reflecting surfaces are at 45 degrees to the plane vertical to the optical axis of the rays reflected by the first reflecting surface, arranging so that rays from an object pass through an objective and are reflected by the first, second, third and fourth reflecting surfaces in this order, and arranging the four reflecting surfaces to satisfy the relation expressed by the following formula:

$$\sin \beta \cos \omega - \cos \rho \tan (\beta - \nu) - \tan \alpha \sin \omega = 0$$

$$\{\omega = \omega_1 + \omega_2 \text{ and } \nu = \omega_1 - \omega_2\}$$

$$\omega = \omega_1 + \omega_2, \nu = \omega_1 - \omega_2 \neq 0, \alpha \neq 0 \text{ and } \beta \neq 0$$

wherein reference symbol $\omega_1$ represents the angle between the plane vertical to the optical axis of the objective and the plane including the optical axis of the rays reflected by the second reflecting surface and directed toward the third reflecting surface, reference symbol $\omega_2$ represents the angle between the plane vertical to the optical axis of the rays reflected by the second reflecting surface and directed toward the third reflecting surface and the plane including the optical axis of the eyepiece, reference symbol $\beta$ represents the rotational angle of the Porro prism in the clockwise direction from the plane including the optical axes of the objective and eyepieces around the optical axis of the objective, and reference symbol $2\alpha$ represents the internal angle between the right and left objectives.

BRIEF DESCRIPTION OF THE DRAWINGS

FIG. 6 shows arrangement of reflecting surfaces of the Porro prism employed in the binocular stereo-microscope according to the present invention; and FIG. 7a and FIG. 7b shows the state of rotation of the Porro prisms shown in FIG. 6 at the time of pupil distance adjustment.

DETAILED DESCRIPTION OF THE PREFERRED EMBODIMENT

Now, the detailed content of the binocular stereo-microscope according to the present invention is described below.

Figure 2:
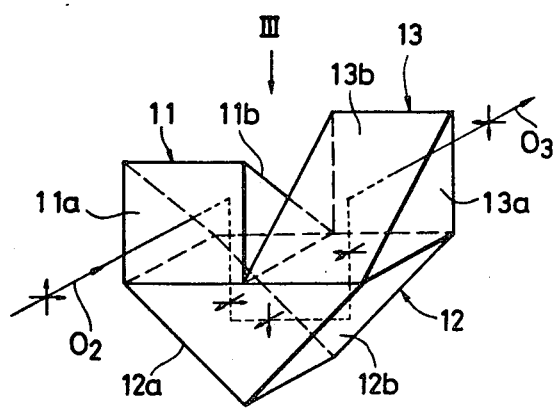
FIG. 2 shows a perspective view illustrating an example of a Porro prism employed in a binocular stereo-microscope.
Figure 3:
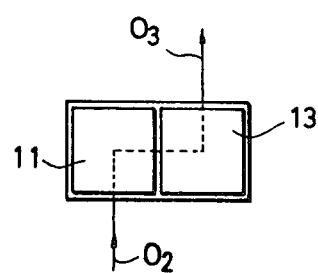
FIG. 3 shows an elevation of the Porro prism shown in FIG. 2 as seen in the direction of arrowhead III.

Though there are various shapes of Porro prisms, the Porro prisms having the shape as shown in FIG. 2 are widely used in stereo-microscopes. That is, the Porro prism shown in FIG. 2 has such shape that three triangular prisms, one large prism 12 and two small prisms 11 and 13, are cemented together as shown in this figure. The ray which enters the Porro prism through the surface $11a$ is reflected by the surfaces $11b$, $12a$, $12b$ and $13b$, and goes out through the surface $13a$. Both the surfaces $11b$ and $13b$ are at 45 degrees to the horizontal plane. When this Porro prism is arranged in an optical path, the position of optical axis is parallelly shifted from $O_2$ to $O_3$ as shown in FIG. 2 and the image is inverted in both vertical and horizontal directions. The Porro prism seen in the direction of arrowhead III in FIG. 2 is shown in FIG. 3.

Figure 1:
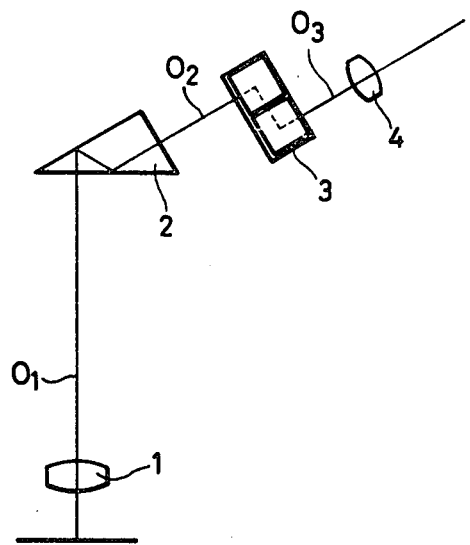
FIG. 1 shows an example of an optical system of a known binocular stereo-microscope.
Figure 4A:
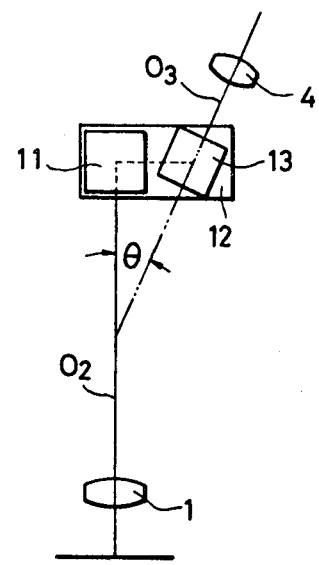
FIG. 4A shows a side view of an optical system with a modified Porro prism arranged in a microscope.
Figure 4B:
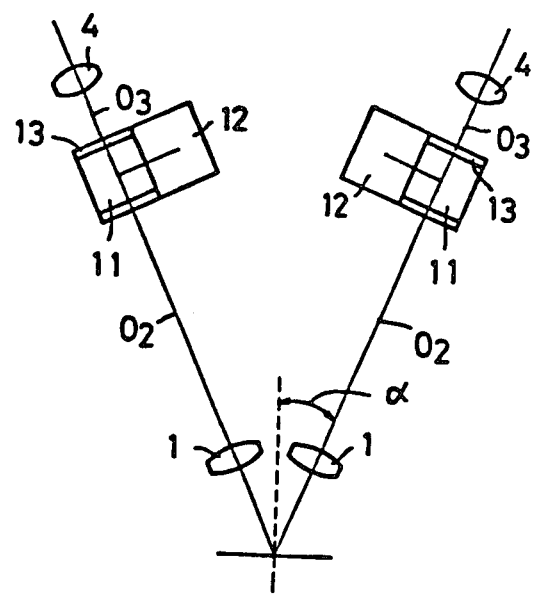
FIG. 4B shows an elevational view of the optical system of FIG. 4A.

Now, the method for deflecting the optical axis using such shape of Porro prism is considered below. The simplest way is as shown in FIGS. 4A and 4B. That is, as shown in FIG. 4A out of the three triangular prisms 11, 12 and 13, the prism 13 is inclined by a pre-determined angle $\theta$. As a result, the optical axis $O_3$ which goes out from the Porro prism is also inclined by the angle $\theta$ in respect to the vertical direction. Therefore, it is possible to arrange the tube as an inclined tube without using the optical axis deflecting prism 2 employed in the known optical system shown in FIG. 1. Thus, as shown in FIG. 4B, by providing two of an optical system having this kind of Porro prism placed between the objective 1 and eyepiece 4 and arranged so as to have an angle $2\alpha$ therebetween, it is possible to form a binocular stereo-microscope which does not necessitate the optical axis deflecting prism 2.

In this method, however, the ray incident on the surface 13b becomes oblique to the plane vertical to the surface 13b and is reflected by the surface 13b. Therefore, the image rotates in the field of view and, consequently, the right and left images of the stereo-microscope do not coincide each other. In other words, images become as shown by solid lines in FIG. 5 though they should become as shown by broken lines.

Figure 5:
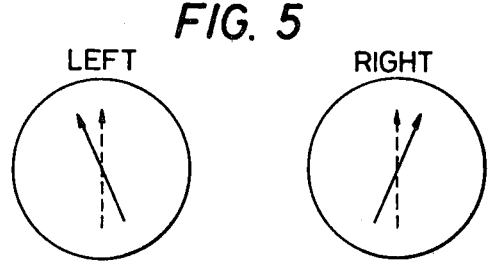
FIG. 5 shows the right and left fields of view of a binocular microscope having the optical system shown in FIGS. 4A and 4B.

In the present invention, the prism 12 is inclined from the plane vertical to the optical axis $O_1$ of the objective by an angle $\omega_1$ as shown in FIG. 6 in order to correct the inclination of images shown in FIG. 5. When the prism 12 is inclined as described in the above, the ray entered the prism 11 and reflected by the surface 11b becomes incident on the surface 12b of the prism 12 in the state that the ray is inclined in respect to the plane vertical to the surface 12b and, then, the ray is reflected by the surface 12b. Consequently, the image inclines. The ray reflected by the surface 12b becomes incident on the surface 13b of the prism 13 in the state that the ray is inclined in respect to the plane vertical to the surface 13b and, then, the ray is reflected by the surface 13b. As a result, the image inclines here again. Therefore, when it is so arranged that the angle of inclination of image to be caused by the surface 12b becomes equal to the angle of inclination of image to be caused by the surface 13b and the directions of inclination become opposite to each other, the images in the right and left fields of view become parallel with each other. Thus, the right and left images coincide each other and enables favourable observation.

With the stereo-microscope, it is necessary to vary the distance between the right and left eyepiece tubes according to the pupil distance of the observer. For this purpose, the method shown in FIGS. 7A and 7B is generally adopted. That is, the left Porro prism 11, 12, 13 and right Porro prism 11', 12', 13' are rotated from the positions shown in FIG. 7A to the positions shown in FIG. 7B by using the optical axis $O_2$ of the left objective and optical axis $O_2'$ of the right objective respectively as the axes of rotation. Thus, the distance between the optical axes $O_3$ and $O_3'$ is varied and it is possible to thereby adjust the distance between the right and left eyepiece tubes.

When an optical system arranged to direct the ray from the objective to the eyepiece using the above-mentioned Porro prism shown in FIG. 6 is considered and the system of Porro prism is handled as a linear transformation system (congruence transformation system), the condition for making the right and left images coincide each other as described in the above becomes as expressed by the following formula:

$$\sin \beta \cos \omega - \cos \beta \tan (\beta - \nu) - \tan \alpha \sin \omega = 0 \ldots \quad (1)$$

where,
$$\omega_1 + \omega_2 = \omega$$

$$\omega_1 - \omega_2 = \nu \neq 0$$

$\beta$: Rotational angle (not including zero) of Porro prism in the clockwise direction from the plane including the optical axes of the objective and eyepiece around the optical axis of the objective.

$2\alpha$: Internal angle (not including zero) (angle (not including zero) between optical axes of right and left objectives) of binocular stereo-microscope When $\beta$, $\alpha$ and $\omega$ are given, $\nu$ is determined uniquely and, consequently, $\omega_1$ and $\omega_2$ are also determined uniquely. Therefore, the shape of the Porro prism is determined. When the Porro prism having $\omega_1$ and $\omega_2$ determined by the above formula (1) is used, it is possible to form an inclined tube without using the prism 2 for inclining the optical axis and, moreover, it is possible to make the right and left images perfectly coincide each other.

When $\omega_1$ and $\omega_2$ are fixed in the above, the value of $\beta$ which strictly fulfills the above formula also becomes a fixed value. As $\beta$ is the rotational angle for pupil distance adjustment, the value of $\beta$ differs with the observer. Therefore, when the observer changes and the value of $\beta$ becomes different, the right and left images become out of parallel and slight discrepancy of image occurs. As, however, the slight discrepancy of image is compensated by the adjusting functions of eyes and it looks as if the right and left images coincide each other, it is all right when the microscope is used within the range which enables compensation by eyes. This purpose can be attained when the distance from the intersecting point P of the optical axes $O_1$ and $O_2$ (refer to FIG. 6) to each eye point is made adequately long so that the variation of $\beta$ becomes small when pupil distance adjustment is made from the minimum pupil distance to the maximum pupil distance.

For example, when the values of $\omega$ and $\nu$ are $\omega = 35°$ and $\nu = 2°42'$ and range of pupil distance adjustment is $18' < |\beta| < 7°39'$, the inclination angle of the right and left images can be made $1°30'$ or less. When the inclination of images is in this range, it is possible to compensate the discrepancy of image by the adjusting functions of eyes.

Explanation in the above is made for an example employing a Porro prism. However, it is also possible to arrange an optical element having functions similar to the Porro prism by combining reflecting surfaces. In that case, it is not necessary to fix those reflecting surfaces as in the case that the prisms are cemented together. Therefore, it is possible to adjust the value of $\nu$ so that it fulfills the afore-mentioned formula when $\beta$ is varied for pupil distance adjustment. In other words, it is possible to change the relative positions of respective reflecting surfaces, which correspond to the surfaces 11b, 12a, 12b and 13b of the Porro prism, according to the variation of $\beta$. When so arranged, the right and left images perfectly coincide each other.

With the stereo-microscope according to the present invention, it is possible to incline the optical axis of the eyepiece and to obtain an erecting image only by arranging one Porro prism or reflecting members corresponding to the Porro prism between the objective and eyepiece.

I claim:

1. A binocular stereo-microscope comprising a right and left objective, a right and left eyepiece, a right porro prism arranged between said right objective and right eyepiece and a left porro prism arranged between said left objective and left eyepiece, each of said right and left porro prisms having a first, second, third and fourth reflecting surfaces, both said first and fourth reflecting surfaces being at 45 degrees to the plane vertical to the optical axis of the rays reflected by said reflecting surface, said binocular stereo-microscope being arranged so that rays from an object pass through said objective and are reflected by said first, second, third and fourth reflecting surfaces in this order and an image formed by said rays is observed through said eyepiece, and said four reflecting surfaces being arranged to satisfy the relation expressed by the following formula:

$$\sin \beta \cos \omega - \cos \beta \tan (\beta - \nu) - \tan \alpha \sin \omega = 0$$

$$[\omega = \omega_1 + \omega_2 \text{ and } \nu = \omega_1 - \omega_2]$$

$$\omega = \omega_1 + \omega_2, \; \nu = \omega_1 - \omega_2 \neq 0, \; \alpha \neq 0 \text{ and } \beta \neq 0$$

wherein reference symbol $\omega_1$ represents the angle between the plane vertical to the optical axis of said objective and the plane including the optical axis of the rays reflected by said second reflecting surface and directed toward said third reflecting surface, reference symbol $\omega_2$ represents the angle between the plane vertical to the optical axis of the rays reflected by said second reflecting surface and directed toward said third reflecting surface and the plane including the optical axis of said eyepiece, reference symbol $\beta$ represents the rotational angle of said porro prism in the clockwise direction from the plane including the optical axes of said objective and eyepieces around the optical axis of said objective, and reference symbol $2\alpha$ represents the internal angle between said right and left objectives.

* * * * *